US012688980B2

(12) United States Patent　　　　(10) Patent No.:　US 12,688,980 B2
　　Oukassi et al.　　　　　　　　　(45) Date of Patent:　　　Jul. 21, 2026

(54) SUPERCAPACITORS HAVING A COMPOSITE SOLID ELECTROLYTE WITH A DIELECTRIC MATRIX, AND METHODS OF THEIR MANUFACTURE

(71) Applicants:Murata Manufacturing Co., Ltd., Nagaokakyo (JP); Commissariat a l'Energie Atomique et Aux Energies Alternatives, Paris (FR)

(72) Inventors: Sami Oukassi, Grenoble (FR); Valentin Sallaz, Cran-Gevrier (FR); Frédéric Voiron, Barraux (FR)

(73) Assignees: MURATA MANUFACTURING CO., LTD., Nagaokakyo (JP); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 172 days.

(21) Appl. No.: 18/532,419

(22) Filed: Dec. 7, 2023

(65) Prior Publication Data

US 2024/0112867 A1　　Apr. 4, 2024

Related U.S. Application Data

(63) Continuation of application No. PCT/EP2022/065905, filed on Jun. 10, 2022.

(30) Foreign Application Priority Data

Jun. 10, 2021　(EP) ..................................... 21305800

(51) Int. Cl.
　　*H01G 11/56*　　　　(2013.01)
　　*H01G 11/06*　　　　(2013.01)
　　(Continued)

(52) U.S. Cl.
　　CPC ............. *H01G 11/56* (2013.01); *H01G 11/06* (2013.01); *H01G 11/84* (2013.01); *H01G 11/04* (2013.01)

(58) Field of Classification Search
　　None
　　See application file for complete search history.

(56) References Cited

U.S. PATENT DOCUMENTS

| | | | |
|---|---|---|---|
| 2006/0183011 A1* | 8/2006 | Mittelsteadt | ........... H01G 9/025 |
| | | | 528/391 |
| 2011/0073827 A1* | 3/2011 | Rubloff | ................. H10F 77/148 |
| | | | 438/129 |

(Continued)

FOREIGN PATENT DOCUMENTS

EP　　　　3796351 A1　　3/2021

OTHER PUBLICATIONS

Cytiva Whatman 8482 Anodisc 174 Filter Membranes—product sheet (No date).*

(Continued)

*Primary Examiner* — Eric W Thomas
(74) *Attorney, Agent, or Firm* — ArentFox Schiff LLP

(57)　　　　　ABSTRACT

A supercapacitor that includes: a first electrode; a second electrode; and a composite solid electrolyte disposed between the first electrode and the second electrode. The composite solid electrolyte includes a dielectric matrix and an ionic conductor disposed in channels/pores in the dielectric matrix. Methods of fabricating such supercapacitors are also disclosed.

13 Claims, 8 Drawing Sheets

(51) Int. Cl.
H01G 11/84 (2013.01)
*H01G 11/04* (2013.01)

(56) References Cited

U.S. PATENT DOCUMENTS

| | | | | |
|---|---|---|---|---|
| 2012/0050949 A1* | 3/2012 | Kim | H01G 11/24 | |
| | | | 29/25.41 | |
| 2013/0040195 A1* | 2/2013 | Hosoe | H01M 4/13 | |
| | | | 429/211 | |
| 2013/0224632 A1* | 8/2013 | Roumi | H01G 11/52 | |
| | | | 29/623.1 | |
| 2019/0287736 A1* | 9/2019 | Yan | H01G 11/32 | |
| 2020/0358134 A1 | 11/2020 | Binninger et al. | | |

OTHER PUBLICATIONS

International Search Report issued for PCT/EP2022/065905, date of mailing Nov. 18, 2022.
Han, Lu et al.; "Recent progress and future prospects of atomic layer deposition to prepare/modify solid-state electrolytes and interfaces between electrodes for next-generation lithium batteries"; Royal Society of Chemistry, Nanoscale Advances, 2021, vol. 3, pp. 2728-2740.
Hollevoet et al.: "Novel Thin-Film Solid Nanocomposite Electrolyte for Lithium-Ion Batteries by Combined MLD and ALD", Adv. Mater. Interfaces, vol. 6, 2019, pp. 1901407 (10 pages).
Zhao et al.: "Atomic/molecular layer deposition for energy storage and conversion", Chemical Society Reviews, vol. 50, 2021, pp. 3889-3956.

* cited by examiner

FIG.2                              PRIOR ART
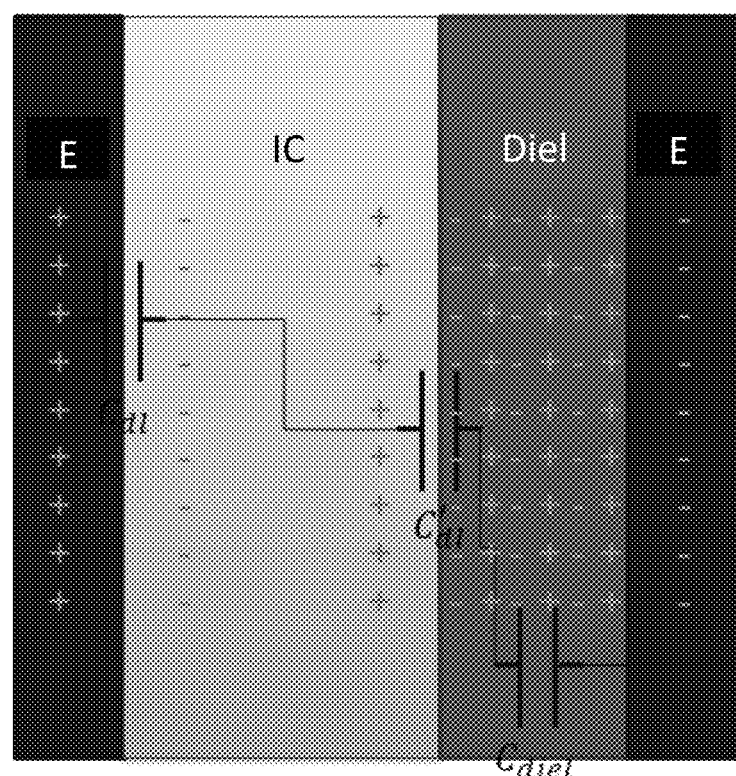

FIG.3(a)
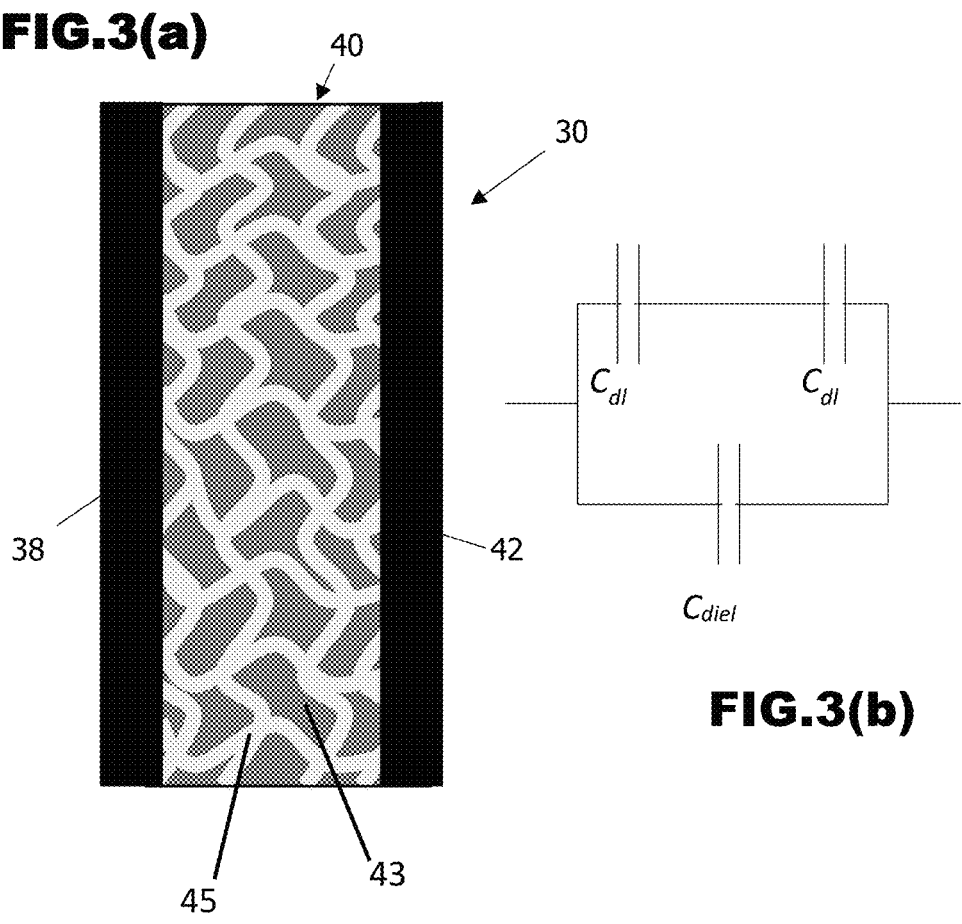
FIG.3(b)
FIG.4
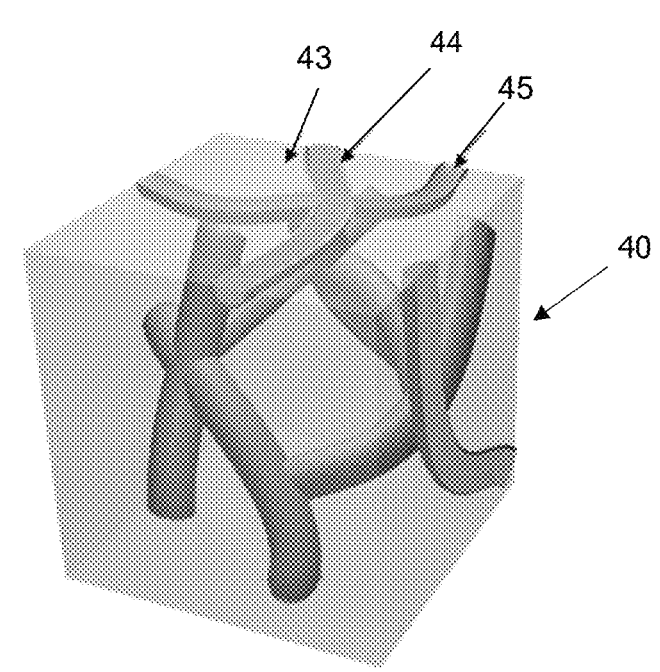

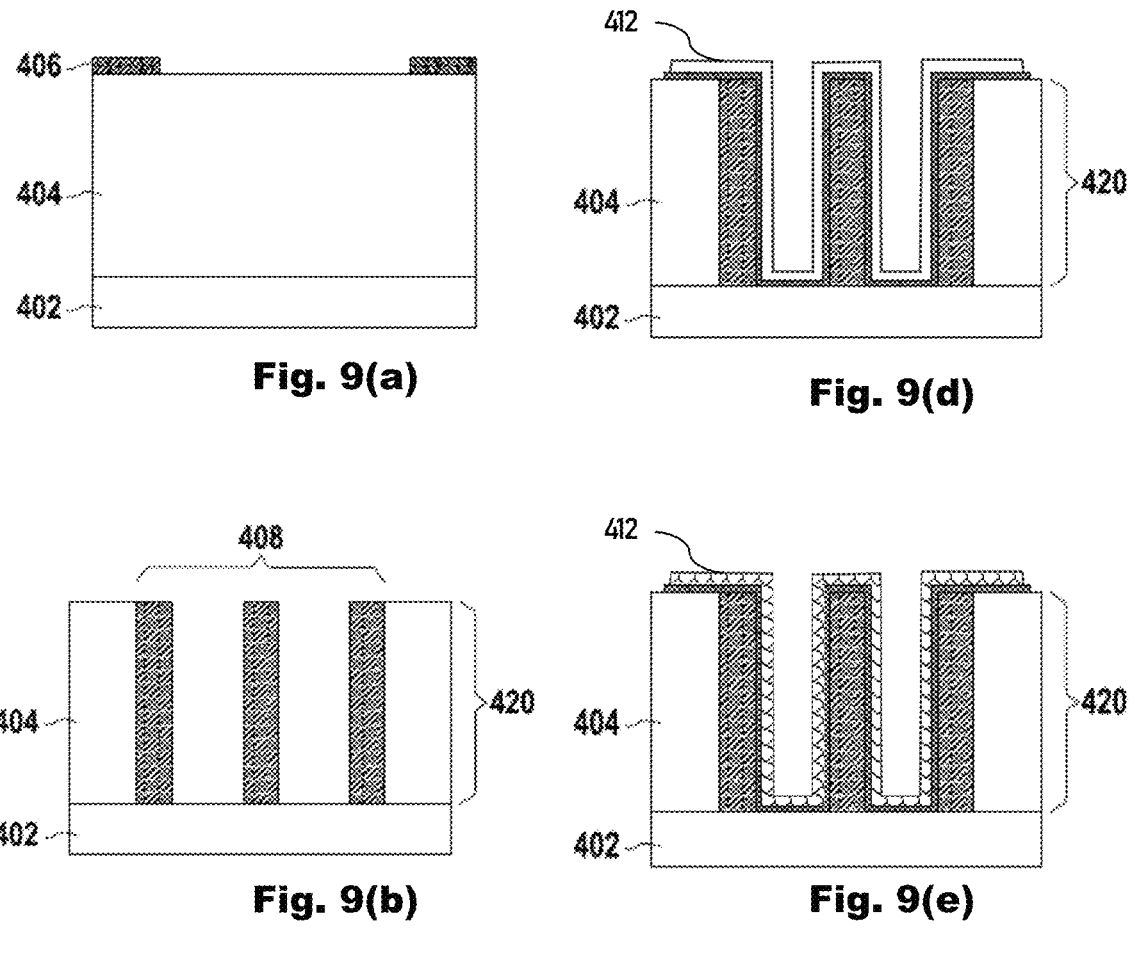
Fig. 9(a)
Fig. 9(d)
Fig. 9(b)
Fig. 9(e)
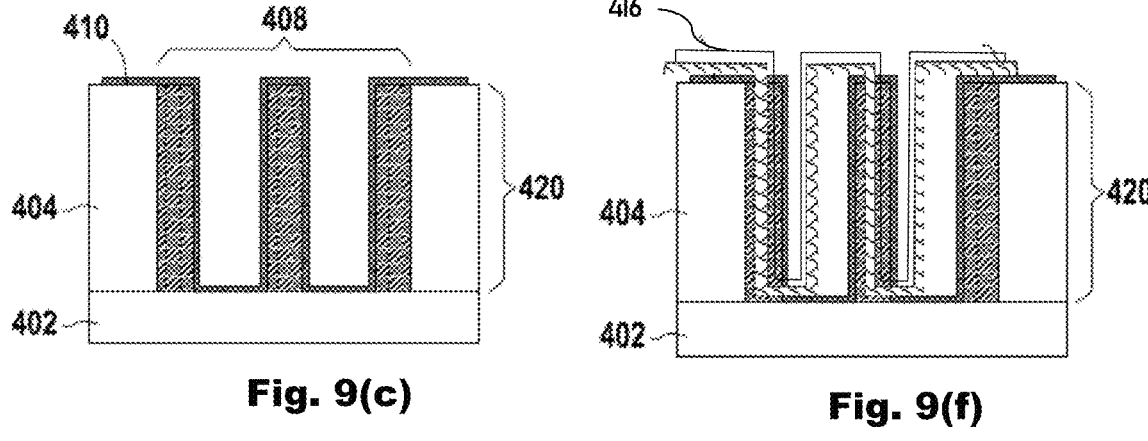
Fig. 9(c)
Fig. 9(f)

SUPERCAPACITORS HAVING A COMPOSITE SOLID ELECTROLYTE WITH A DIELECTRIC MATRIX, AND METHODS OF THEIR MANUFACTURE

CROSS REFERENCE TO RELATED APPLICATIONS

The present application is a continuation of International application No. PCT/EP2022/065905, filed Jun. 10, 2022, which claims priority to European Patent Application No. 21305800.1, filed Jun. 10, 2021, the entire contents of each of which are incorporated herein by reference.

FIELD OF THE INVENTION

The present invention relates to the field of so-called "supercapacitors" (also called "electrochemical capacitors") and, more particularly, relates to improved supercapacitors and methods for manufacturing them.

TECHNICAL BACKGROUND

Supercapacitors include a pair of electrodes and, located between the electrodes, a substance that conducts ions (e.g., ions such as $Li^+$, $Na^+$, etc.) and which may be a solid, a liquid or somewhere in between the two. The ion-conducting substance is often referred to as an electrolyte but may also be referred to below as an "ionic conductor".

When a potential difference is applied to the electrodes of a supercapacitor, ions in the electrolyte move and electrical energy becomes stored at the interface between the negatively-charged electrode and the electrolyte as well as at the interface between the positively-charged electrode and the electrolyte. The energy storage mechanism may involve formation of an electrical double layer at an electrode/electrolyte interface. The energy storage mechanism may involve Faradaic electron charge-transfer with redox reactions, intercalation or electrosorption (pseudocapacitance) at an electrode/electrolyte interface. Devices in which the double-layer formation constitutes the main energy-storage mechanism are called electrostatic double-layer capacitors (EDLCs) and devices in which the faradaic reactions constitute the main energy-storage mechanism are called pseudocapacitors. Hybrid devices also exist which in which formation of an electrical double-layer is the main energy-storage mechanism at one of the electrode/electrolyte interfaces whereas pseudocapacitance is the main energy-storage mechanism at the other electrode/electrolyte interface. The relative contributions to energy storage made by the electrical double-layer and made by pseudocapacitance may change as the frequency of operation (charge-discharge cycle) changes. At high frequencies, i.e., frequencies of the order of MHz or higher, when the electrolyte has adequate electronic isolation properties (i.e., very low electronic conduction), the device's operation may approximate that of a conventional electrostatic capacitor.

In supercapacitors, ions are the useful mobile charge carriers and electron flow across the device tends to be undesirable (constituting an undesired leakage current).

Interest in supercapacitors has grown in recent years in view of their ability to repeatedly and rapidly deliver bursts of high power, making them useful in applications such as regenerative braking in vehicles and elevators. More particularly, supercapacitors can provide significantly higher capacitance values than those provided by electrostatic or electrolytic capacitors, and, typically, can perform hundreds of thousands of recharge cycles before failing.

It has been proposed to construct superconductors in which the ionic conductor consists of an ultra-thin layer of a solid electrolyte, notably a layer a few nanometres thick, in view of increasing the devices' power density, or to enable use of a three-dimensional capacitor architecture (i.e., an architecture in which a stack of capacitor layers (electrode-ionic conductor-electrode) is formed over pillars or trenches/holes provided on/in a substrate). Processes such as atomic level deposition (ALD) have been proposed for formation of thin layers constituting the electrodes and ionic conductor.

However, in cases where the ionic conductor layer is extremely thin problems can arise, especially in the case where the layer of ionic conductor is being deposited in a space having a high aspect ratio. These problems can degrade the properties of the supercapacitor. Some such problems will be described with reference to FIGS. 1(a), (b) and (c), which illustrate examples of thin ionic conductor layers in a supercapacitor stack that is deposited over holes/trenches in a substrate.

FIGS. 1(a), (b) and (c) illustrate cross-sectional views of an example 3D supercapacitor 1. As shown in FIG. 1, supercapacitor 1 includes a 3D structure 4 formed over a substrate 2. In this example the 3D structure 4 includes a porous anodized alumina (PAA) region 6 in which a stacked structure is embedded. The stacked structure includes a first electrode layer 8, a solid electrolyte layer 10 (ionic conductor), and a second electrode layer 12.

To increase the power density and the frequency response of the supercapacitor 1, the solid electrolyte layer 10 is only a few nanometers thick. For this purpose, the deposition of the solid electrolyte layer 10 is typically done using Atomic Layer Deposition (ALD) with the aim of promoting a high degree of conformality of the solid electrolyte layer 10 to the shape of the PAA region 6.

Nevertheless, for a PPA region 6 with a high aspect ratio (e.g., >100), achieving conformality of the solid electrolyte layer 10 is a very challenging task due to the fact that exposure of the surface to the precursors (used during the ALD of the electrolyte) is typically non-uniform along the pores of the PAA region 6. For example, in experiments involving formation of a solid electrolyte layer made of lithium phosphorous oxy-nitride (LiPON) by ALD, the inventors of the present invention have observed that for a PAA region with an 80 nm pore diameter, conformality issues begin to appear at a pore height beyond approximately 5 microns.

As shown in FIG. 1, the inhomogeneous deposition of the solid electrolyte layer 10 into the pores of the PAA region 6 typically results in regions R1 of inhomogeneous composition (see FIG. 1(a)), i.e., regions with stoichiometric imbalance, and inhomogeneity in layer thickness (see FIG. 1(b)). The inhomogeneity in layer thickness typically produces regions R2, where the solid electrolyte is thinned, that constitute weak spots vulnerable to breakdown and electronic leakage. More severely, the inhomogeneous deposition may create discontinuities in the solid electrolyte leading to short circuits SC between the electrodes of the supercapacitor (see FIG. 1(c)).

These defects may be reduced by decreasing the aspect ratio of the 3D structure, increasing the thickness of the solid electrolyte layer, and/or adjusting the ALD parameters (e.g., performing more ALD cycles, improving the residence time of precursors, or using smaller molecule precursors). However, these solutions come at the cost of significantly increasing the process cost/time and hindering the ultimate goal of maximizing capacitance density.

Moreover, use of ALD to deposit the thin layer of ionic conductor can impact properties such as the mobility of the ions.

In view of overcoming such problems the inventors have proposed, in earlier patent application EP 3796351, to include a layer of dielectric material within the supercapacitor structure. In a symmetric supercapacitor device, a dielectric layer may be interposed between the ionic conductor and one of the electrodes, as is illustrated in the diagram of FIG. 2. Such a dielectric layer may prevent discontinuities in the electrode from causing locally-thin regions in the ionic conductor, protecting weak points from electrical breakdown, and prevent the problems of short-circuiting discussed above. However, there are certain disadvantages to such an approach.

Firstly, the dielectric layer acts like an additional capacitance connected in series with the capacitance of the two electrode/ionic conductor interfaces, thereby reducing the overall capacitance of the device by an amount proportional to the thickness of the dielectric layer. Secondly, the dielectric significantly reduces ion mobility within the device, reducing the ability of the device to respond to rapid voltage changes. Indeed, the presence of the dielectric lowers the cut-off frequency at which the device can operate and causes capacitive losses at high scan rate.

The present invention has been made in view of the above-described issues.

SUMMARY OF THE INVENTION

The present invention provides a supercapacitor comprising: a first electrode; a second electrode; and a composite solid electrolyte disposed between the first electrode and the second electrode; wherein the composite solid electrolyte comprises a dielectric matrix and an ionic conductor disposed in channels/pores in the dielectric matrix.

In supercapacitors according to the invention, the discontinuous structure of the composite solid electrolyte efficiently passivates defects created during deposition of the layers forming the superconductor stack. Thus, the ion mobility can be increased while still reducing defects that would be caused by regions of inhomogeneous composition and regions of inhomogeneous thickness of the electrolyte layer and while still mitigating short circuits that would be caused by discontinuities in the electrolyte layer.

The present invention further provides a method of fabricating the above supercapacitors, as recited in appended claim 10.

BRIEF DESCRIPTION OF THE DRAWINGS

Further features and advantages of the present invention will become apparent from the following description of certain embodiments thereof, given by way of illustration only, not limitation, with reference to the accompanying drawings in which:

FIG. 2 schematically represents a prior art supercapacitor structure in which a dielectric layer is interposed between one electrode and a solid electrolyte;

FIG. 3(*a*) and FIG. 3(*b*) schematically represents an example of a supercapacitor structure according to an embodiment of the present invention;

FIG. 4 is a diagram illustrating structure in a composite solid electrolyte that may be used in embodiments of the present invention;

FIG. 9(*a*)-FIG. 9(*f*) schematically represents stages in a method to fabricate a supercapacitor according to the embodiment illustrated in FIG. 8.

DETAILED DESCRIPTION OF EXAMPLE EMBODIMENTS

Figure 1A:
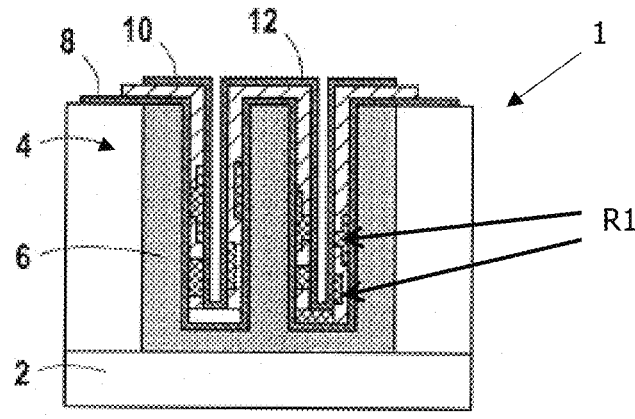
FIG. 1(*a*)-FIG. 1(*c*) illustrates problems associated with the formation of a solid electrolyte layer within a high aspect ratio 3D structure.
Figure 1B:
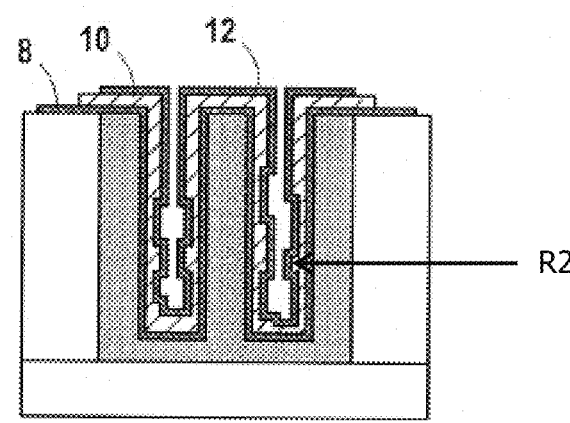
Figure 1C:
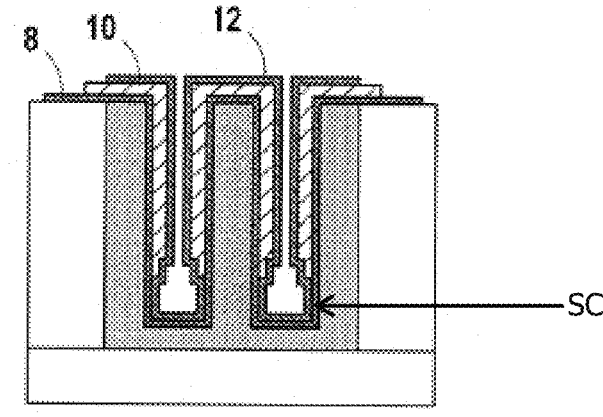

The principles of the present invention will be better understood from the description below of certain embodiments.

Embodiments involving supercapacitors which are electrostatic double-layer capacitors (EDLCs) will be described below with reference to FIGS. 3-8. However, it is to be understood that the invention is not limited to EDLCs but applied also to other types of supercapacitors, notably pseudocapacitors and hybrid devices.

FIG. 3 represents schematically an embodiment 30 of a first supercapacitor structure according to the invention. According to the example illustrated in FIG. 3, the supercapacitor structure 30 includes electrodes 38, 42 and a layer of composite solid electrolyte 40 interposed between the electrodes 38, 42 (as can be seen in the cross-sectional view (a) in FIG. 3). The layer of composite solid electrolyte 40 comprises dielectric material, 43, and ionic conductor material, 45, disposed in channels/pores in the dielectric matrix 43.

The electrodes may each include one or more layers of conductive material. In certain embodiments, the conductive material is one suitable for ALD deposition. Without limitation, the conductive material may be platinum, ruthenium, molybdenum, cobalt, titanium, titanium nitride, tantalum nitride, $RuO_2$, $CO_3O_4$, $V_2O_5$, $TiO_x$ (x=0.5-2) or $WO_x$ (x=0.5-3). The conductive material may be associated with certain oxides (see below).

The dielectric material, 43, forming the matrix in the composite solid electrolyte 40 may be made of any convenient material that provides a significant degree of electrical insulation. For example, in one embodiment the dielectric material is made of $(Li—)Al_2O_3$. In certain embodiments, the dielectric is preferably a paraelectric material. As a paraelectric, the dielectric material is characterized by a substantially constant permittivity at high frequencies (for example >1 kHz which is the typical cutoff frequency of LiPON) which ensures capacitance stability at the high frequencies. Further, as a paraelectric, the dielectric material exhibits greater dielectric strength compared to a ferroelectric material, for example, which is advantageous given that one role of the dielectric material is to prevent breakdown and electronic leakage. In certain embodiments, the dielectric material is made of alumina, silicon oxide, or hafnium oxide.

The ionic conductor material, 45, in the composite solid electrolyte 40 may be made of any convenient material that allows conduction of ions but significantly impedes the flow of electrons. For example, in one embodiment the ionic conductor, 45, is made of LiPON. However, other materials may be used including, but not limited to, $Li_3PO_4$, $Li_2CO_3$, $LiAlF_4$, LiSiPON, $Li_2SiO_3$, LiI, $LiClO_4$, LiF, or any inorganic lithium ion conductor. Moreover, other materials besides glass ion conductors may be used, for instance: garnets (e.g., $Li_7La_3Zr_2O_{12}$ (LLZO), $Li_6La_3Hf_{1.5}Ta_{0.5}O_{12}$ (LLHTO), etc.), perovskites ((Li,La)$TiO_3$ (LLTO), (Li,La, Al)$TiO_3$), etc.), and so on. In certain preferred embodiments of the invention the ionic conductor has conductivity of at least $10^{-7}$ S/cm, more preferably at least $10^{-6}$ S/cm.

In preferred embodiments of the invention the ionic conductor material is compatible with ALD deposition. Some examples of suitable ionic conductor materials that may be deposited by ALD are listed in Table 1 of Electronic Supporting Information accessible at d0na01072c1.pdf (rsc.org) for the paper "Recent progress and future Perspective on Atomic Layer Deposition to Prepare/Modify Solid-State Electrolytes and Interface between Electrodes for Next-Generation Lithium Batteries" by Han et al (Nanoscale Advances, 2021, 3, 2728-2740, Royal Society of Chemistry), the entire contents of which are incorporated herein by reference.

In preferred embodiments of the invention both of the dielectric, 43, and the ionic conductor, 45, are made of inorganic (mineral) materials.

View (b) in FIG. 3 represents an approximate equivalent circuit representing the frequency behavior of the supercapacitor 30 illustrated in cross-section in view (a) of FIG. 3. The supercapacitor electrodes 38, 42 correspond to a pair of capacitors Cdl, Cdl connected in series, and the dielectric of the composite solid electrolyte 40 corresponds to a capacitance Cdiel connected in parallel to the pair of capacitors Cdl, Cdl.

As mentioned above, the present inventors have noted that the mobility of ions within a layer of dielectric is relatively low. However, ion mobility is relatively greater at boundaries between a dielectric layer and an ionic conductor, as compared with ion mobility within the bulk of the dielectric layer. The inventors have designed an improved supercapacitor structure which incorporates a composite solid electrolyte 40 comprising dielectric material and ionic conductor material interspersed with one another, notably by providing the ionic conductor in pores/channels of a dielectric matrix, so that there is a high concentration of boundaries between the dielectric material and the ionic conductor material.

In the composite solid electrolyte 40 used in embodiments of supercapacitor according to the invention, the surface area of boundaries between the dielectric material and ionic conductor material is increased as compared to the case where these materials are provided in separate discrete layers. By adopting a structure in which a significant fraction of the volume of the solid electrolyte 40 is occupied by boundaries between the dielectric material and the ionic conductor material, a large number of fast ion conduction paths between the electrodes 38, 42 are provided and this enhances the macroscopic ion conductivity observed for the overall device. Moreover, the discontinuous structure of the composite solid electrolyte 40 efficiently passivates defects created during deposition of the layers forming the superconductor stack. Accordingly, the ion mobility can be increased while still reducing defects that would be caused by regions of inhomogeneous composition and regions of inhomogeneous thickness of the electrolyte layer and while still mitigating short circuits that would be caused by discontinuities in the electrolyte later.

Various additional advantages derive from the use of such a composite solid electrolyte within supercapacitors embodying the invention.

Firstly, it will be recalled that in many supercapacitors the energy storage mechanism at the interfaces between the electrolyte and the electrodes changes with operating frequency. For instance, the ionic conductor LiPON behaves as an electronic polarizable material at high frequencies (typically >100 kHz), and, thus, the relative contribution of electrical double-layer capacitance to energy storage, decreases at high frequencies in supercapacitors employing LiPON as the ionic conductor. In embodiments of the present invention, the cut-off frequency of the double layer capacitive contribution can be adjusted by tuning the mix of dielectric material to ionic conductor material in the composite solid electrolyte of such a supercapacitor. Tuning the mix of dielectric material to ionic conductor material can also enhance the Z uniformity during transitions from predominantly double layer energy storage to predominantly electronic polarization, i.e., making the capacitance values in the ionic and electrostatic domains closer to each another.

Secondly, the breakdown voltage and/or electrical leakage in a supercapacitor according to embodiments of the invention can be adjusted by tuning the mix of dielectric material to ionic conductor material in the composite solid electrolyte.

In the supercapacitor structure 30 illustrated in FIG. 3, it may be considered that the dielectric material in the composite solid electrolyte 40 constitutes a kind of matrix containing channels within which the ionic conductor is located. This arrangement is illustrated in FIG. 4, in which a boundary, 45, between the dielectric material 43 and the ionic conductor material 45 is labelled. (In FIG. 4, the electrodes 38, 42 are not shown). It may be considered that the dielectric matrix has a certain degree of porosity. The number, shape and orientation of the channels in the dielectric matrix, and/or the degree of porosity of the dielectric matrix, can vary depending on process conditions during the fabrication of the composite solid electrolyte. In preferred embodiments of the invention the pore diameter is no greater than 25% of the thickness of the dielectric material. Typically, the dielectric material is microporous having pore diameter no greater than 5 nm.

Figure 5:
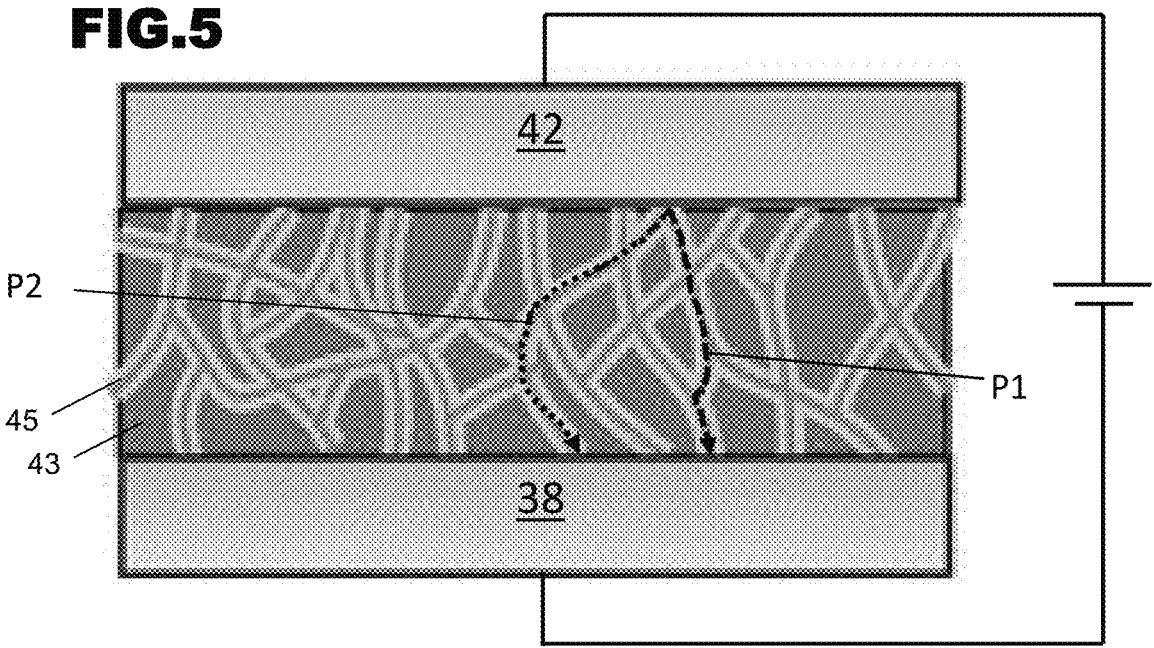
FIG. 5 schematically represents paths for displacement of ions within a composite solid electrolyte useable in embodiments of the present invention.

When a potential difference is applied to the electrodes 38, 42 of the supercapacitor 30, ions travel preferentially along channels that are oriented in alignment with the electric field direction, e.g., path P1 illustrated in FIG. 5, as opposed to paths, such as P2, which are less well aligned with the direction of the electric field.

One approach for further improving ion mobility within the composite solid electrolyte 40 is to employ a dielectric matrix having channels that tend to be oriented along (or at relatively small angles to) the direction of the electric field that arises between the electrodes 38, 42 when a potential difference is applied across the supercapacitor, rather than being oriented perpendicular to the electric field direction or randomly oriented. In practice it may be difficult to control process conditions so as to ensure achievement of such a structure. Another approach for improving ion mobility within the composite solid electrolyte 40 is to employ a dielectric matrix that has a high degree of porosity and/or a high degree of complexity (in terms of the interlacing of channels within the dielectric matrix) so that there is an increased probability that ions can find a short path between the electrodes 38, 42 when a potential difference is applied across the supercapacitor 30.

A method of manufacturing a supercapacitor, according to an embodiment of the present invention, will now be described with reference to FIGS. 6 and 7.

Figure 6:
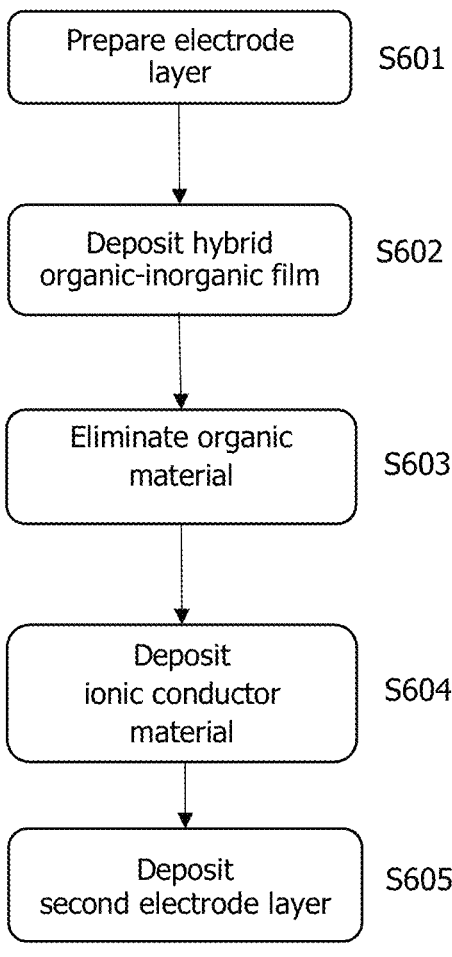
FIG. 6 is a flow diagram illustrating steps of a method to fabricate a supercapacitor according to an embodiment of the invention.

At the start of the method an electrode layer 38 is prepared (S601 in FIG. 6). The electrode layer 38 may be formed by any convenient method appropriate to the conductive material forming the electrode. For instance, the conductive material may be one suitable for ALD deposition. Without limitation, the conductive material deposited to form the electrode layer 38 may be platinum, ruthenium, molybdenum, cobalt, titanium, titanium nitride, tantalum nitride, $RuO_2$, $CO_3O_4$, $V_2O_5$, $TiO_x$ (x=0.5-2) or $WO_x$ (x=0.5-3).

The electrode layer 38 may consist of a stack of two or more layers made of different materials. In some such cases, one or more layers of conductive material may be associated with oxides, e.g., $RuO_2$, TiOx, that are sufficiently conductive of electrons that they still enable the desired value of electrical potential to be established at the electrode-solid electrolyte interface. Associating such oxides to the conductive material may allow additional low frequency storage modes to be implemented which further contribute to the overall capacitance of the device.

For EDLCs, it is preferred to use Li inert materials (e.g., Pt, Ru, Mo, Ti, TiN) in the electrode layer 38. For pseudo-capacitors and hybrid capacitors, it is necessary to include additional transition metal oxides.

In view of the integration of the device, the overall thickness $T_{38}$ of the electrode layer 38 typically is set at or below 20 nm. Typically, then, each layer of material making up part of the electrode layer 38 has a thickness in the range 5 nm layer thickness 20 nm.

Figure 7A:
FIG. 7(*a*)-FIG. 7(*e*) schematically represents stages in the method of FIG. 6.

FIG. 7(a) shows the electrode layer 38 in isolation. However, in practice, typically the electrode layer 38 is formed on a supporting substrate. For instance, in the embodiment discussed below with reference to FIG. 8 the electrode layer 108 is deposited substantially conformally in hole/trenches provided in a porous AAO layer 106 on a substrate 102.

Figure 7B:
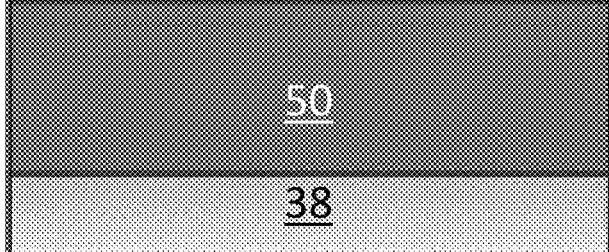

Next, a hybrid organic-inorganic film 50 is deposited on the electrode layer EM (see S602 in FIG. 6, and FIG. 7(b)). In preferred embodiments of the invention the hybrid organic-inorganic film 50 is made of an $Al_2O_3$/ethylene glycol (EG)-based alucone thin film, or a glycerol-based alucone, and is deposited by atomic/molecular layer deposition (MLD). As the process for forming a hybrid organic-inorganic film 50 made of such materials, methods may be employed that are described in "Novel Thin-Film Solid Nanocomposite Electrolyte for Lithium-Ion Batteries by Combined MLD and ALD" by Hollevoet et al, Adv. Mater. Interfaces 2019, 6, 1901407, the entire contents of which are incorporated herein by reference. However, the methods according to the present invention are not limited to use of such processes.

An advantage of using MLD as the deposition method is that the precursor chemistry in MLD can use small, bifunctional organic molecules. Molecular layer deposition processes comprise self-limiting surface reactions carried out in a sequential manner, allowing building blocks to be assembled in a controlled manner to produce hybrid organic-inorganic materials. The inorganic component of the hybrid organic-inorganic film comprises a dielectric material, for instance: $Al_2O_3$, $SiO_2$, $HfO_2$, and so on.

The thickness $T_{50}$ of the hybrid organic-inorganic film typically is set in the range $5 \leq nm \ T_{50} \leq 20$ nm.

Figure 7C:
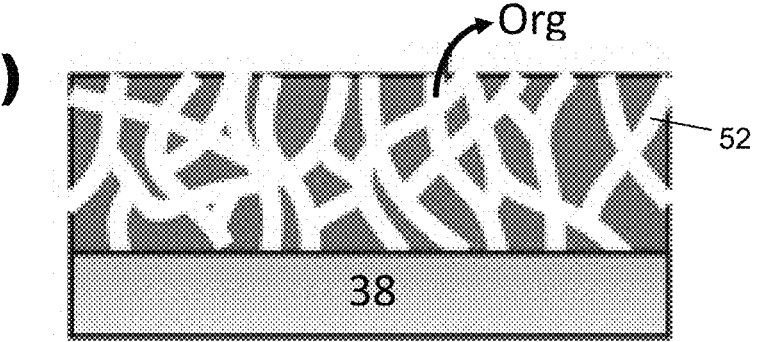

The organic components are then eliminated from the hybrid organic-inorganic film by any convenient process (see S603 in FIG. 6). Suitable techniques for eliminating the organic components are to perform a water etch or by calcination as in the above-mentioned paper by Hollevoet et al. The removal of the organic components leaves channels and/or pores in the remaining inorganic material. Thus, the remaining inorganic material forms a dielectric matrix, as shown in FIG. 7(c).

Besides the techniques described above, other processes based on ALD/MLD that may be used in embodiments of the invention, to form microporous or mesoporous structures including a first organic component and a second inorganic (metal or dielectric) component, are described in the review paper "Atomic/molecular layer deposition for energy storage and conversion" by Zhao et al, Chemical Society Reviews, Issue 6, 2021, 50, 3889-3956, the entire contents of which are incorporated herein by reference.

Figure 7D:
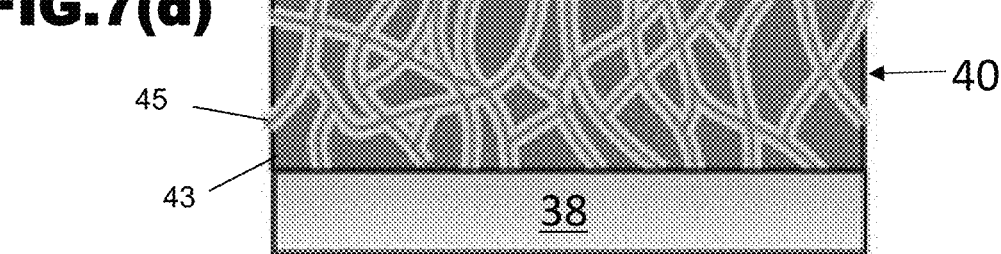

Ionic conductor material is deposited in the channels/pores of the dielectric matrix (see S604 in FIG. 6) to form a composite solid electrolyte CSE as illustrated in FIG. 7(d). In preferred embodiments of the invention the ionic conductor material is deposited in the dielectric matrix by atomic layer deposition (ALD).

As would be understood by a person of skilled in the art based on the teachings herein, an ALD process includes various parameters that impact its outcome. While some of these parameters may be more difficult to adjust (e.g., equipment, substrate), others may be readily varied to impact the deposition outcome. According to embodiments, the ALD process for the deposition of the ionic conductor material is designed a priori so that the ionic conductor substantially fills the channels in the porous dielectric matrix. This includes selecting one or more parameters, including the deposition technique (surface controlled versus controlled), the number of ALD cycles (each cycle consisting of a precursor dosing half-cycle, an exposure step, a purge step, a co-reactant dosing half-cycle, an exposure step, and a purge step), the dosage levels of the precursor and co-reactant in each ALD cycle, the lengths of the precursor/co-reactant half-cycles in each ALD cycle, the lengths of the purge steps in each ALD cycle, etc. Using a simulation tool or experimentally, the outcome of a designed ALD process in a particular dielectric matrix can be verified.

Figure 7E:
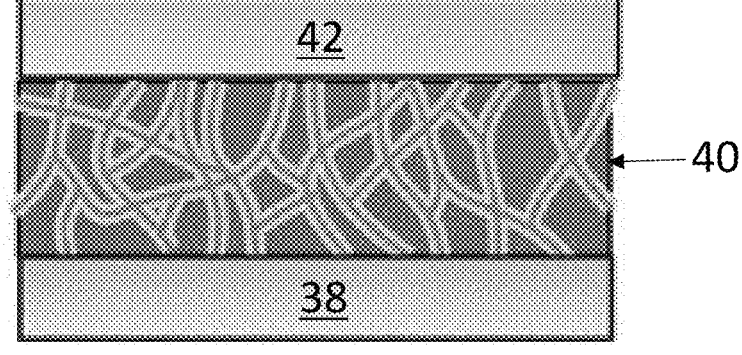

The supercapacitor structure is completed by forming a second layer of electrode material, 42, on the free surface of the composite solid electrolyte 40, facing the first layer of electrode material, 38 (see S605 in FIG. 6, and FIG. 7(e)). The second layer of electrode material, 42, may be formed using the same types of materials and deposition processes as those used for the first electrode layer 38 and generally has the same thickness as the first electrode layer 38.

Figure 8:
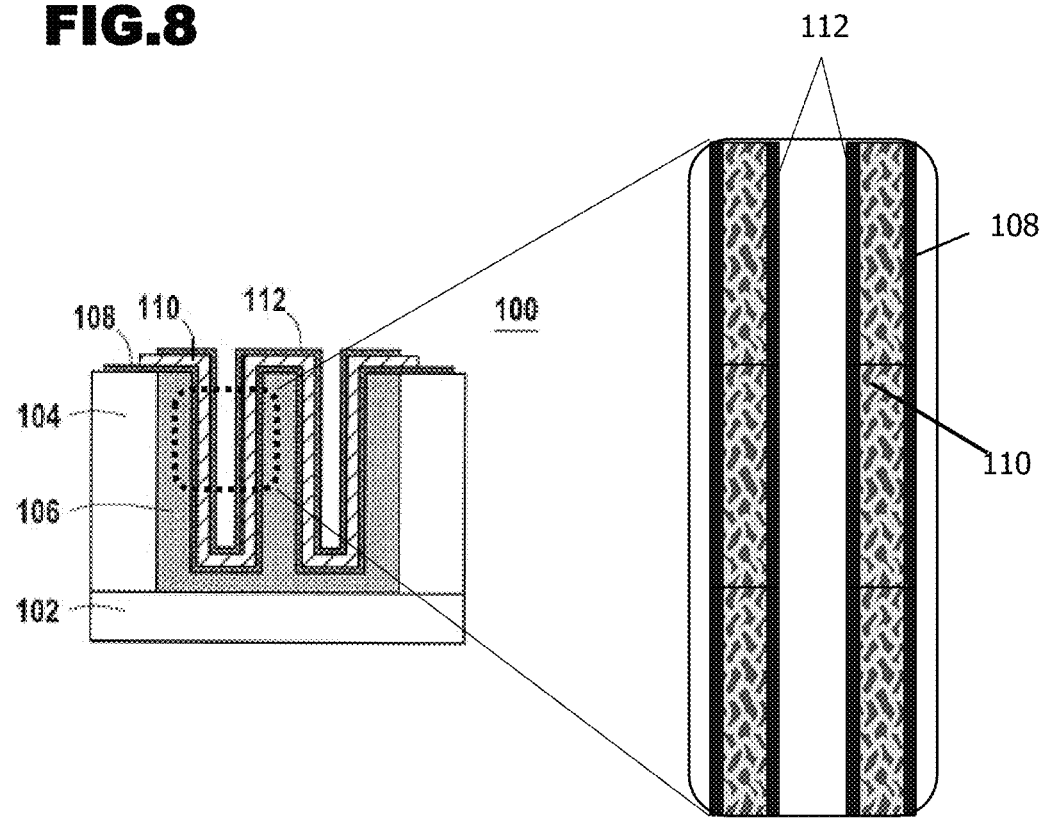
FIG. 8 illustrates an example of a 3D structure incorporating a supercapacitor according to an embodiment of the present invention.

The combination of MLD and ALD processes employed in preferred embodiments of the above-described method are particularly well-suited to creation of a 3D supercapacitor structure, such as that illustrated in FIG. 8, wherein the stack of electrode-electrolyte-electrode layers constituting the supercapacitor is formed in trenches/holes having a high aspect ratio.

The 3D supercapacitor 100 illustrated in FIG. 8 includes a 3D structure 104 formed over a substrate 102. In this example the 3D structure 104 includes a porous anodized alumina (PAA) region 106 in which a stacked structure is embedded. The stacked structure includes a first electrode layer 108, a solid electrolyte layer 110 (ionic conductor), and a second electrode layer 112. The solid electrolyte layer 110 is a composite solid electrolyte as discussed above with reference to FIGS. 3-5. The stacked structure is formed with the aim of being substantially conformal with the shape of the underlying holes/trenches in the PAA region 106. However, less than ideal conformality may be tolerated provided that it does not interfere with the desired performance level of the supercapacitor.

For the purpose of illustration, and without limitation, a method of fabricating the three-dimensional structure according to FIG. 8, including elongated pores, is now described with reference to FIG. 9.

As shown in FIG. 9(*a*), this method includes forming a metal layer 404 above the substrate 402, and depositing a hard mask layer 406 on the metal layer 404. The metal layer 404 may be made of aluminum, though other metals such as titanium or tungsten may also be used. Preferably, the metal used for the metal layer 404 is a metal that anodizes to provide a well-organized porous region. Where it is open, the hard mask layer 406 defines a section within the metal layer 404 where anodization of the metal layer 404 is desired.

The thickness $T_{404}$ of the metal layer 404 typically is set in the range 1 $\mu m \leq T_{404} \leq 20$ $\mu m$.

The thickness $T_{406}$ of the hard mask layer 406 typically is set in the range $0.1 \leq T_{406} \leq 1$ $\mu m$.

Next, as shown in FIG. 9(*b*), the section of the metal layer 404 defined by the hard mask layer 406 is anodized to form the region 408 comprising an anodic oxide layer having pores. In an embodiment, the anodization of metal layer 404 includes a first anodization step, an etching step, and a second anodization step. The first anodization step forms an anodic oxide layer having shallow pores on top of the metal layer 404. The formed anodic oxide layer is then etched resulting in the top surface of metal layer 404 developing a texture that defines the eventual pore locations. The second anodization step completes the anodization of the metal layer 404 to form the pores as shown in FIG. 9(*b*).

In the case of embodiments in which the capacitive structure is integrated in silicon, the pore height, Hp, typically is set in the range 0.5 $\mu m \leq Hp \leq 20$ $\mu m$. However, in the case of other passive integration processes, e.g. MLCC, pore height up to 1 mm may be allowed.

The pore diameter Dp preferably is set in the range 50 $nm \leq Dp \leq 100$ nm where the highest density can be achieved.

Subsequently, as shown in FIG. 9(*c*), the proposed method includes forming a first electrode layer 410 over a surface of the region 408 of the three-dimensional structure 420, substantially conformal to the surface of the region 408, for instance using materials and processes described above in connection with FIG. 7(*a*). The overall thickness $T_{410}$ of the first electrode layer 410 typically is set at or below 20 nm.

As used herein, a layer is "conformal" to a (directly or indirectly) underlying layer (or surface) when its conformality is greater than or equal to 80% where it extends along the shape of the underlying layer (or surface). The layer is considered "non-conformal" to the underlying layer (or surface) when its conformality is lower than 50% where it extends along the shape of the underlying layer (or surface). According to embodiments, the layer and the underlying layer (or surface) are shaped in accordance with a 3D structure with elongated pores or elongated columns. the conformality of the layer relative to the underlying layer (or surface) is determined as the ratio between the thickness of the layer measured at the bottom surface of the underlying layer (or surface) (i.e., the surface of the underlying layer or surface at the bottom of the pores or inter-column trenches of the 3D structure) and the thickness of the layer measured at the top surface of the underlying layer (or surface) (i.e., the surface of the underlying layer or surface overlying the top surface of the 3D structure). The thickness of the layer at a given depth (e.g., pore bottom or at the top surface) may be determined by performing measurements at a select number of points of the given depth and averaging the measurements. To achieve the required conformality level, ALD with increased exposure time may be used.

Next, a hybrid organic-inorganic film 412 is formed over the first electrode layer 410, as shown in FIG. 9(*d*), for instance using materials and processes described above in connection with FIG. 7(*b*). The thickness $T_{412}$ of the hybrid organic-inorganic film 412 typically is set in the range 5 $nm \leq T_{412} \leq 20$ nm.

Then, organic components are driven out of the hybrid organic-inorganic film 412, for instance using processes described above in connection with FIG. 7(*c*), and the formation of the composite solid electrolyte 414 is completed by depositing an ionic conductor in the vacated channels/pores in the hybrid organic-inorganic film 412 as shown in FIG. 9(*e*), for instance using materials and processes described above in connection with FIG. 7(*d*).

Finally, as shown in FIG. 9(*f*), the process terminates with forming a second electrode layer 416 over the composite solid electrolyte 414, for instance using materials and processes described above in connection with FIG. 7(*d*). The thickness $T_{416}$ of the second electrode layer 416 typically is set at or below 20 nm.

Additional Variants

Although the present invention has been described above with reference to certain specific embodiments, it will be understood that the invention is not limited by the particularities of the specific embodiments. Numerous variations, modifications and developments may be made in the above-described embodiments within the scope of the appended claims.

Thus, for example, certain specific embodiments described above relate to electronic components in which a 3D supercapacitor structure is formed in wells (holes, trenches) in a substrate. The invention applies irrespective of the shape of the wells/trenches: thus, for example, the invention may be applied in the case of cylindrical wells or pores, elongated trenches, linear or meandering trenches, and so on. Moreover, the proposed supercapacitor structure may be formed according to a 3D architecture in which a stack of electrode and electrolyte layers are formed over pillars, columns, nanowires and the like on a substrate. Again, in such a case the invention may be applied irrespective of the precise cross-sectional shape of such pillars etc. Furthermore, the invention is not limited to the case of supercapacitors having a 3D architecture; to the contrary the invention may be applied also in planar supercapacitors.

As another example, the detailed description above refers to supercapacitors that are EDLCs but other types of supercapacitors may be constructed employing the principles of the present invention. Thus, for example, in embodiments where the supercapacitor is a pseudocapacitor, the electrodes may each be formed as a bilayer that includes a conductive layer and an oxide layer suitable for fast diffusion/intercalation of ions. The oxide layer may also be selected to be suitable for adsorption occurring at the interface between the oxide layer and the conductive layer. The oxide layers enhance faradaic reactions at the electrode/electrolyte interfaces (i.e., reactions in which metal elements, e.g., Li, are oxidized to result in metal ions, e.g., Li+) and result in increased charge density at the interfaces.

The invention claimed is:

1. A supercapacitor comprising:

a first electrode;

a second electrode; and a composite solid electrolyte disposed between the first electrode and the second electrode;

wherein the composite solid electrolyte comprises a dielectric matrix and an ionic conductor disposed in channels/pores in the dielectric matrix, and the channels forming an interconnected and interlaced network within the dielectric matrix, and the network defining a plurality of non-linear ion-conductive pathways between the first electrode and the second electrode.

2. The supercapacitor according to claim 1, wherein both of the dielectric matrix and the ionic conductor are made of inorganic materials.

3. The supercapacitor according to claim 1, wherein the dielectric matrix of the composite solid electrolyte has a porosity of 20% or more.

4. The supercapacitor according to claim 1, wherein the dielectric matrix of the composite solid electrolyte has a porosity in the range of 20%-50%.

5. The supercapacitor according to claim 1, wherein the composite solid electrolyte has a thickness of 20 nanometers or less.

6. The supercapacitor according to claim 1, wherein the dielectric matrix of the composite solid electrolyte is made of Li—($Al_2O_3$).

7. The supercapacitor according to claim 1, wherein the ionic conductor is made of LiPON.

8. The supercapacitor according to claim 1, wherein the first electrode, composite solid electrolyte and second electrode form a stack of layers following the three-dimensional shape of pillars or holes in an underlying substrate.

9. The supercapacitor according to claim 1, wherein each of the first electrode and second electrode is configured to form an electrical double layer at the interface thereof with the composite solid electrolyte upon application of a potential difference to the first and second electrodes.

10. The supercapacitor according to claim 1, wherein the first electrode and the second electrode each includes a conductive layer and an oxide layer suitable for diffusion/intercalation of ions of the ionic conductor material, said oxide layer being disposed at an interface between the conductive layer and the composite solid electrolyte.

11. The supercapacitor according to claim 1, wherein the first electrode includes a conductive layer and an oxide layer suitable for diffusion/intercalation of ions of the ionic conductor material, said oxide layer being disposed at an interface between the conductive layer and the composite solid electrolyte, and the second electrode is configured to form an electrical double layer at the interface thereof with the composite solid electrolyte upon application of a potential difference to the first and second electrodes.

12. A method of fabricating a supercapacitor comprising:

forming a first electrode;

forming on a composite solid electrolyte on the first electrode, wherein the composite solid electrolyte comprises a dielectric matrix and an ionic conductor disposed in channels/pores in the dielectric matrix; and forming a second electrode on the composite solid electrolyte, the channels forming an interconnected and interlaced network within the dielectric matrix, the network defining a plurality of non-linear ion-conductive pathways between the first electrode and the second electrode.

13. The method according to claim 12, wherein the forming of the composite solid electrolyte comprises:

deposition of a hybrid organic-inorganic layer;

elimination of organic components from the deposited hybrid organic-inorganic layer to leave a dielectric matrix having vacant channels/pores therein; and deposition of ionic conductor material in the channels/pores of the dielectric matrix.

* * * * *